US012231290B2

(12) United States Patent
A et al.

(10) Patent No.: US 12,231,290 B2
(45) Date of Patent: *Feb. 18, 2025

(54) EDGE CONTROLLER WITH NETWORK PERFORMANCE PARAMETER SUPPORT

(71) Applicant: Juniper Networks, Inc., Sunnyvale, CA (US)

(72) Inventors: Chandrasekhar A, Bangalore (IN); Frank Jas, Sunnyvale, CA (US); Premchandar N, Bangalore (IN); Amarnath B. Satyan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,206

(22) Filed: Feb. 5, 2024

(65) Prior Publication Data

US 2024/0179051 A1    May 30, 2024

Related U.S. Application Data

(63) Continuation of application No. 18/146,820, filed on Dec. 27, 2022, now Pat. No. 11,936,520, which is a
(Continued)

(51) Int. Cl.
*H04L 41/0806* (2022.01)
*H04L 41/084* (2022.01)
(Continued)

(52) U.S. Cl.
CPC ...... *H04L 41/0806* (2013.01); *H04L 41/0843* (2013.01); *H04L 41/0893* (2013.01); *H04L 41/12* (2013.01); *H04L 41/5009* (2013.01)

(58) Field of Classification Search
CPC ............. H04L 41/0806; H04L 41/0843; H04L 41/0893; H04L 41/12; H04L 41/5009
See application file for complete search history.

(56) References Cited

U.S. PATENT DOCUMENTS

| 9,426,178 B1 | 8/2016 | Yanovsky |
| 9,929,918 B2 | 3/2018 | Rosensweig et al. |

(Continued)

FOREIGN PATENT DOCUMENTS

| CN | 105432040 A | 3/2016 |
| CN | 109981769 A | 7/2019 |

(Continued)

OTHER PUBLICATIONS

Bjorklund, "Yang—A Data Modeling Language for the Network Configuration Protocol (NETCONF)," Internet Engineering Task Force (IETF), RFC 6020, Oct. 2010, 174 pp.
(Continued)

*Primary Examiner* — Viet D Vu
(74) *Attorney, Agent, or Firm* — Shumaker & Sieffert, P.A.

(57) ABSTRACT

A method includes receiving a plurality of configurations comprising a first configuration for provisioning a first set of network services at a first resource of an edge device and a second configuration for provisioning a second set of network services at the first resource, a first configuration group identifier identifying a configuration group for the first configuration, and a first network performance parameter for the configuration group. The method further includes determining a performance factor for the first resource providing the first set of network services to one or more client devices. The method further includes, in response to determining that the performance factor does not satisfy the first network performance parameter for the configuration group and that the first configuration group identifier identifies the configuration group for the first configuration, moving the first configuration from the first resource to a second resource of the edge device.

20 Claims, 11 Drawing Sheets

Related U.S. Application Data continuation of application No. 17/247,867, filed on Dec. 28, 2020, now Pat. No. 11,611,474.

(51) Int. Cl.
*H04L 41/0893* (2022.01)
*H04L 41/12* (2022.01)
*H04L 41/5009* (2022.01)

(56) References Cited

U.S. PATENT DOCUMENTS

| | | | |
|---|---|---|---|
| 10,516,761 B1 | 12/2019 | A et al. | |
| 10,841,159 B2 | 11/2020 | Croy et al. | |
| 10,884,728 B2 | 1/2021 | A et al. | |
| 10,990,385 B1 | 4/2021 | Farhangi et al. | |
| 10,992,543 B1* | 4/2021 | Rachamadugu | H04L 41/0853 |
| 11,140,049 B2 | 10/2021 | A et al. | |
| 11,537,447 B2 | 12/2022 | Bernat et al. | |
| 11,611,474 B2 | 3/2023 | A et al. | |
| 11,645,131 B2* | 5/2023 | Monk | G06F 11/0712 714/57 |
| 11,936,520 B2 | 3/2024 | A et al. | |
| 2006/0288086 A1 | 12/2006 | Gopalakrishnan | |
| 2011/0153791 A1 | 6/2011 | Jones | |
| 2016/0094483 A1 | 3/2016 | Johnston et al. | |
| 2016/0112269 A1* | 4/2016 | Singh | H04L 41/0895 709/224 |
| 2017/0093750 A1 | 3/2017 | McBride et al. | |
| 2018/0359143 A1 | 12/2018 | Chattopadhyay et al. | |
| 2019/0052531 A1 | 2/2019 | Sividia et al. | |
| 2019/0238410 A1* | 8/2019 | Kang | H04L 41/0873 |
| 2020/0169856 A1 | 5/2020 | Yang et al. | |
| 2020/0244527 A1 | 7/2020 | Sharma et al. | |
| 2020/0274772 A1 | 8/2020 | A et al. | |
| 2020/0301685 A1 | 9/2020 | Verma | |
| 2020/0313980 A1 | 10/2020 | A et al. | |
| 2020/0351167 A1 | 11/2020 | Sharma et al. | |
| 2020/0358859 A1 | 11/2020 | Gupta et al. | |
| 2021/0194988 A1 | 6/2021 | Chaysinh et al. | |
| 2022/0135533 A1 | 5/2022 | Li | |
| 2022/0210009 A1 | 6/2022 | A et al. | |

FOREIGN PATENT DOCUMENTS

| | | |
|---|---|---|
| CN | 110890976 A | 3/2020 |
| CN | 111817870 A | 10/2020 |
| CN | 111936973 A | 11/2020 |
| CN | 112104473 A | 12/2020 |
| EP | 3716534 A1 | 9/2020 |

OTHER PUBLICATIONS

Communication pursuant to Article 94(3) EPC from counterpart European Application No. 21217566.5 dated Feb. 22, 2024, 4 pp.
Enns et al., "Network Configuration Protocol (NETCONF)," Internet Engineering Task Force (IETF), RFC 6241, Jun. 2011, 114 pp.
Enns, "NETCONF Configuration Protocol," Network Working Group, RFC 4741, Dec. 2006, 96 pp.
Extended Search Report from counterpart European Application No. 21217566.5 dated May 6, 2022, 12 pp.
First Office Action and Search Report, and translation thereof, from counterpart Chinese Application No. 202111617652.6 dated Oct. 16, 2023, 19 pp.
Harrington et al., "An Architecture for Describing Simple Network Management Protocol (SNMP) Management Frameworks," Network Working Group, RFC 3411, Dec. 2002, 65 pp.
Hu et al., "Software-Defined Edge Computing (SDEC): Principles, Open System Architecture and Challenges", 2019 IEEE Smartworld, Aug. 19, 2019, Pages pp. 8-16.
Notice of Intent to Grant from counterpart Chinese Application No. 202111617652.6 dated Mar. 27, 2024, 4 pp.
Prosecution History from U.S. Appl. No. 17/247,867, dated Oct. 21, 2021 through Jan. 19, 2023, 138 pp.
Prosecution History from U.S. Appl. No. 18/146,820, dated Sep. 20, 2023 through Feb. 16, 2024, 30 pp.
Response to Extended Search Report dated May 6, 2022, from counterpart European Application No. 21217566.5 filed Dec. 19, 2022, 27 pp.
Rodrigues et al., "Cloudlets Activation Scheme for Scalable Mobile Edge Computing with Transmission Power Control and Virtual Machine Migration", IEEE Transactions on Computers, vol. 67, No. 9, Sep. 1, 2018, pp. 1287-1300.
Response to Communication pursuant to Article 94(3) EPC dated Feb. 22, 2024, from counterpart European Application No. 21217566.5 filed Jun. 20, 2024, 12 pp.

* cited by examiner

EDGE CONTROLLER WITH NETWORK PERFORMANCE PARAMETER SUPPORT

This application is a continuation of U.S. patent application Ser. No. 18/146,820, filed on Dec. 27, 2022, granted as U.S. Pat. No. 11,936,520, which is a continuation of U.S. patent application Ser. No. 17/247,867, filed on Dec. 28, 2020, granted as U.S. Pat. No. 11,611,474, the entire content of each application being incorporated herein by reference.

TECHNICAL FIELD

This disclosure relates to computer networks, and more particularly, to managing network devices.

BACKGROUND

Network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system allows administrators describe the intended network/compute/storage state. User intents can be categorized as stateful intents (e.g., business policies) or stateless intents. Stateful intents may be resolved based on the current state of a network. Stateless intents may be fully declarative ways of describing an intended network/compute/storage state, without concern for a current network state.

Intents may be represented as intent data models, which may be modeled using a unified graph model. Intent data models may be represented as connected graphs, so that stateful intents can be implemented across business computing architecture. For example, data models may be represented using data structures such as, for example, connected graphs having vertices connected with has-edges and reference (ref) edges. Controller devices may model intent data models as a unified graph model. In this manner, stateful intents can be implemented across intent data models. When intents are modeled using a unified graph model, extending new intent support may extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to the device configuration model.

An administrator may provide cloud networking services using intents. For example, the administrator may provide service level agreement (SLA) parameters, such as, for example, jitter or bandwidth to an intent-based networking system. The intent-based networking system may configure resources (e.g., virtual routers, servers, etc.) to satisfy the SLA parameters. Moreover, rather than relying on a single geographic location (e.g., a central site) to provide resources, the intent-based networking system may select resources of "edge devices" that are geographically positioned near sites for customers over resources of edge devices that are geographically remote sites from sites for customers. For example, to reduce an amount of latency, the intent-based networking system may use resources of an edge devices that is geographically proximate to a particular site for a customer rather than resources of edge devices that are remote from the particular site. In this way, the cloud networking services may be provided by an edge device that is geographically proximate to a site, which may provide faster responses and transfer rates compared to systems that use geographically remote edge devices (e.g., only a central site).

SUMMARY

In general, this disclosure describes techniques to provide a network performance parameter (e.g., a service-level agreement (SLA) parameter) to a set of client devices. Some edge controllers may use a central controller to monitor and ensure that provisioned resources satisfy network performance parameters. However, such central controllers may be temporarily disconnected from the edge controllers, particularly when the edge controllers are remote from the central device. While temporarily disconnected from the edge controllers, the central controller may not monitor and ensure that provisioned resources satisfy network performance parameters, which may result in the edge controllers providing a network performance that does not satisfy a network performance parameter (e.g., an SLA parameter).

Rather than relying solely on a central controller to monitor and ensure that provisioned resources satisfy network performance parameters, techniques described herein may configure the edge controllers to monitor and ensure that provisioned resources satisfy network performance parameters. For example, an edge controller may re-provision a network service from a first resource to a second resource based on a network performance parameter. For instance, the edge controller may re-provision network routing services from a first virtual router to a second virtual router when the first virtual router provides an amount of bandwidth that is lower than a SLA parameter. In this way, the edge controllers may provide cloud networking services at a higher availability compared to edge controllers that rely on a central controller to monitor and ensure that provisioned resources satisfy network performance parameters.

In one example, this disclosure describes a method that includes receiving, by an edge controller implemented in circuitry and from a central controller, a plurality of configurations comprising a first configuration for provisioning a first set of network services at a first resource of an edge device and a second configuration for provisioning a second set of network services at the first resource, a first configuration group identifier identifying a configuration group for the first configuration, and a first network performance parameter for the configuration group. The method further includes, after applying the plurality of configurations to the first resource, determining, by the edge controller, a performance factor for the first resource providing the first set of network services to one or more client devices. The method further includes, in response to determining that the performance factor does not satisfy the first network performance parameter for the configuration group and that the first configuration group identifier identifies the configuration group for the first configuration, moving, by the edge controller, the first configuration from the first resource to a second resource of the edge device.

In another example, this disclosure describes a device configured to manage a plurality of network devices and comprising processing circuitry configured to receive, from a central controller, a plurality of configurations comprising a first configuration for provisioning a first set of network services at a first resource of an edge device and a second configuration for provisioning a second set of network services at the first resource, a first configuration group identifier identifying a configuration group for the first configuration, and a first network performance parameter for the configuration group. The processing circuitry is further configured to, after the plurality of configurations has been applied to the first resource, determine a performance factor for the first resource providing the first set of network services to one or more client devices. The processing circuitry is further configured to, in response to a determination that the performance factor does not satisfy the first network performance parameter for the configuration group and that the first configuration group identifier identifies the configuration group for the first configuration, move the first configuration from the first resource to a second resource of the edge device.

In one example, this disclosure describes a computer-readable storage medium comprising one or more instructions that cause processing circuitry to receive, from a central controller, a plurality of configurations comprising a first configuration for provisioning a first set of network services at a first resource of an edge device and a second configuration for provisioning a second set of network services at the first resource, a first configuration group identifier identifying a configuration group for the first configuration, and a first network performance parameter for the configuration group. The instructions further cause the processing circuitry to, after the plurality of configurations has been applied to the first resource, determine a performance factor for the first resource providing the first set of network services to one or more client devices. The instructions further cause the processing circuitry to, in response to a determination that the performance factor does not satisfy the first network performance parameter for the configuration group and that the first configuration group identifier identifies the configuration group for the first configuration, move the first configuration from the first resource to a second resource of the edge device.

The details of one or more examples are set forth in the accompanying drawings and the description below. Other features, objects, and advantages will be apparent from the description and drawings, and from the claims.

BRIEF DESCRIPTION OF DRAWINGS

Like reference characters refer to like elements throughout the figures and description.

DETAILED DESCRIPTION

Figure 1:
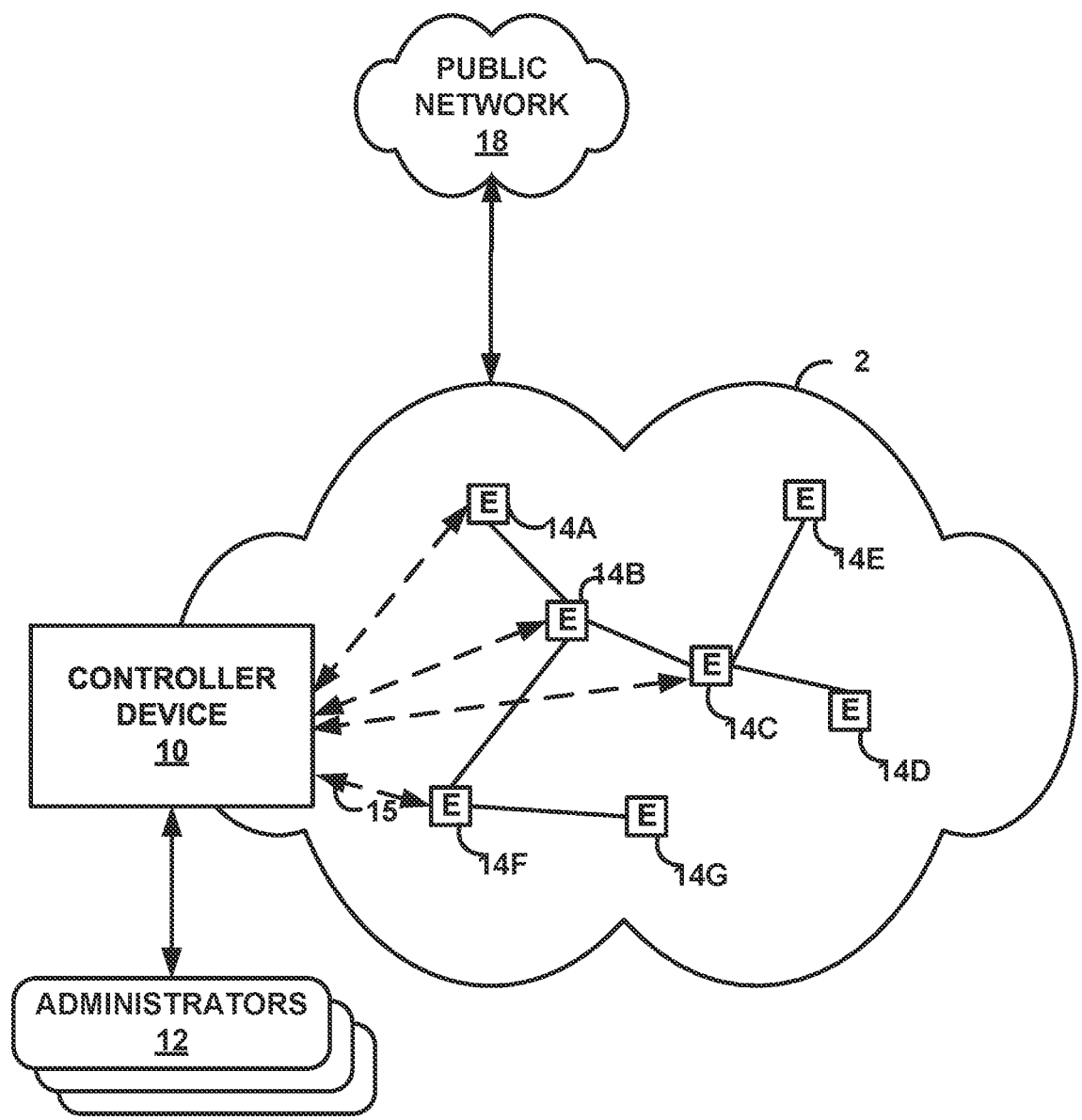
FIG. 1 is a block diagram illustrating an example including network elements of an enterprise network that are managed using a controller device, in accordance with the techniques of the disclosure.

This disclosure is directed to controller devices supporting edge computing. Edge computing may refer to a distributed architecture that reduces latency by hosting applications, data, and/or compute resources at locations geographically closer to end users (e.g., client devices). Cloud Networking services may be provided from the "cloud," such that customers can avoid the overhead of managing the network infrastructure and services in their premises. Cloud Network services may provide network capabilities and resources on demand from the cloud. Cloud services may include, for example, security services or connectivity services (e.g., software-driven wide-area network (SD-WAN)) and may be provided from the cloud. Cloud services may be provided with 99.99999 . . . % of a service level agreement (SLA). Based on intent, a controller device (e.g., a central controller) may select resources, compile the intent, and generate a configuration to be applied to resources (e.g., implemented by network devices) that satisfies the intent and/or satisfies the SLA.

Edge Computing architecture may be implemented to improve a performance of an network, for example, to provide a faster responses time and/or higher data transfer rates (e.g., an amount of bandwidth). Edge Computing may move a computation away from a centralized cloud (e.g., a central controller) towards the "edge" of the network. The resources in the "edge cloud" may provide network services (e.g., computing services, security services, etc.) to a customer network. By moving network services to the edge of the network, the edge computing architecture may provide faster response times and/or higher data transfer rates. However, distributing the logic to different controllers (e.g., a central controller and one or more edge controllers) and network nodes may introduce one or more problems. For example, an edge controller may comprise one or more of: a compute constraint, an accessibility and/or operation constraint, and/or a remote management constraint. In some examples, the edge controller may comprise a connectivity issue, where, for example, the edge computing architecture may work with latency and/or jitter issues with the central controller.

In accordance with the techniques of the disclosure, an edge controller, rather than only the central controller, may be configured to monitor and manage resources to ensure that resources satisfy network performance parameters (e.g., SLA parameters). For example, the edge controller may receive resource allocation context indicating network performance parameters. In this example, the edge controller may, without further communication with the central controller, "move" a configuration of a resource when the resource is not meeting the network performance parameters. For instance, the edge controller may move routing for client devices for a tenant from a first virtual router to a second virtual router when SLA parameters for the tenant are not being satisfied by the first virtual router. Again, the edge controller may move routing for the client devices even when the edge controller is unable to communicate with the central controller, which may be referred to herein as "headless mode." After moving the routing and/or once communication with the central controller is restored, the edge controller may synchronize with the central controller to notify the central controller of the change in configuration. In this way, the edge controller may help to ensure that resources satisfy network performance parameter even when connectivity between the central controller and the edge controller is lost, which may help to improve a performance (e.g., lower jitter, lower latency, higher bandwidth, higher reliability, higher throughput, etc.) of the network.

Again, the central controller may select resources, compile the intent, and generate a configuration to be applied to resources (e.g., a network device or a virtualized device) that satisfies a stateful intent and/or satisfies one or more network performance parameters. As such, the edge controller may move the configuration generated by the central controller (and resource allocation context) without managing stateful intents and/or a unified graph model, which may require a relatively high computational capacity. In this way, the edge controller may be implemented using lightweight stateless edge controllers. Moreover, as described herein, the edge controller may move, without prompting by the central controller, a configuration of a resource when the resource is not satisfying the network performance parameters, which may help to ensure that resources satisfy network performance parameter when connectivity between the central controller and the edge controller is lost. Ensuring that resources satisfy network performance parameter when connectivity between the central controller and the edge controller is lost may help to improve a performance (e.g., reduce an amount of lower jitter, lower an amount of latency, increase an amount of bandwidth, increase a reliability, etc.) of the network. In this way, the central controller may provide a management plane for the network and the edge controller may receive configurations from the central controller, which may reduce a complexity of the edge controller. For example, rather than compiling an intent to generate a configuration, the edge controller may move an existing configuration to available resources and output an indication of the move to the central controller, which may update a unified graph model for the network performance parameter.

FIG. 1 is a block diagram illustrating an example including network devices of an enterprise network 2 that are managed using a controller device 10. Network elements 14A-14G (collectively, "network elements 14") of enterprise network 2 include network elements interconnected via communication links to form a communication topology in order to exchange resources and information. Network elements 14 (also generally referred to as remote network devices) may include, for example, edge devices, routers, switches, gateways, bridges, hubs, servers, firewalls or other intrusion detection systems (IDS) or intrusion prevention systems (IDP), computing devices, computing terminals, printers, other network devices, or a combination of such devices. Edge devices may be configured for edge POP, which may indicate a location for network services running in a cloud for a given edge device. One or more edge controllers may be configured to manage resources. Edge devices may be configured to provide edge computing. Edge computing may refer to a distributed architecture that reduces latency by hosting applications, data, and/or compute resources at locations geographically closer to end users. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting network elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to network elements 14 via enterprise network 2. Controller device 10, in some examples, forms part of a device management system, although only one device of the device management system is illustrated for purpose of example in FIG. 1. Controller device 10 may be an example of a central controller. Controller device 10 may be coupled either directly or indirectly to the various network elements 14. Once network elements 14 are deployed and activated, administrators 12 uses controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed network elements 14. Another example device protocol may include NETCONF, however, techniques described herein may be used with other device protocols. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. Another example device protocol may include NETCONF, however, techniques described herein may be used with other device protocols. Further details of the NETCONF protocol can be found in Enns et al., RFC 6241, "Network Configuration Protocol (NETCONF)," Network Working Group, the Internet Engineering Task Force draft, June 2011, available at https://tools.ietf.org/html/rfc6241, the entire contents of which are incorporated herein by reference.

In common practice, controller device 10, also referred to as a network management system (NMS) or NMS device, and network elements 14 are centrally maintained by an IT group of the enterprise. Administrators 12 interacts with controller device 10 to remotely monitor and configure network elements 14. For example, administrators 12 may receive alerts from controller device 10 regarding any of network elements 14, view configuration data of network elements 14, modify the configurations data of network elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses controller device 10 or a local workstation to interact directly with network elements 14, e.g., through telnet, secure shell (SSH), or other such communication sessions. That is, network elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of network elements 14, e.g., network element 14F, using controller device 10, to directly configure network element 14F. In this manner, a user can provide commands in a format for execution directly to network element 14.

Further, administrators 12 can also create scripts that can be submitted by controller device 10 to any or all of network elements 14. For example, in addition to a CLI interface, network elements 14 also provide interfaces for receiving scripts that specify the commands in accordance with a scripting language. In a sense, the scripts may be output by controller device 10 to automatically invoke corresponding remote procedure calls (RPCs) on the managed network elements 14. The scripts may conform to, e.g., extensible markup language (XML) or another data description language.

Administrators 12 uses controller device 10 to configure network elements 14 to specify certain operational characteristics that further the objectives of administrators 12. For example, administrators 12 may specify, for network element 14A, a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of network elements 14.

Controller device 10 may be configured to compare a new intent data model to an existing (or old) intent data model, determine differences between the new and existing intent data models, and apply the reactive mappers to the differences between the new and old intent data models. In particular, controller device 10 determines whether the new set of configuration data includes any additional configuration parameters relative to the old intent data model, as well as whether the new set of configuration data modifies or omits any configuration parameters that were included in the old intent data model.

The intent data model may be a unified graph model, while the low-level configuration data may be expressed in YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. In some examples, the intent data model may be expressed in YAML Ain't Markup Language (YAML). Controller device 10 may include various reactive mappers for translating the intent data model differences. These functions are configured to accept the intent data model (which may be expressed as structured input parameters, e.g., according to YANG or YAML). The functions are also configured to output respective sets of low-level device configuration data changes, e.g., device configuration additions and removals. That is, $y_1=f_1(x)$, $y_2=f_2(x)$, ... $y_N=f_N(x)$.

Controller device 10 may use YANG modeling for intent data model and low-level device configuration models. This data may contain relations across YANG entities, such as list items and containers. Conventionally, controller devices do not support configuration management functions in real time. As discussed in greater detail below, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks.

Intents are declarative. To realize intents, controller device 10 attempts to select optimal resources.

In accordance with the techniques of the disclosure, network element 14A (e.g., an edge controller of network element 14A) may receive, from controller device 10 (e.g., a central controller of controller device 10), a plurality of configurations comprising a first configuration for provisioning a first set of network services at a first resource of the edge device and a second configuration for provisioning a second set of network services at the first resource, a first configuration group identifier identifying a configuration group for the first configuration, and a first network performance parameter for the configuration group. As described further herein the first configuration group identifier may identify a tenant and/or a branch for one or more client devices to be provided the first set of network services. The first network performance parameter may specify, for example, an amount of bandwidth, an amount of latency, a jitter, or another network performance parameter.

Network element 14A may apply the plurality of configurations at the first resource. After applying the plurality of configurations to the first resource, network element 14A may determine a performance factor (e.g., an amount of bandwidth, an amount of latency, and/or an amount of jitter) for the first resource providing the first set of network services to one or more client devices. Network element 14A may determine that the performance factor does not satisfy the first network performance parameter. In response to a determination that the performance factor does not satisfy the first network performance parameter and that the first configuration group identifier identifies the configuration group for the first configuration, network element 14A may move the first configuration from the first resource to a second resource of network element 14A. For example, network element 14A may remove the first configuration from the first resource and add the first configuration to the second resource. In this way, network element 14A may be configured to help to ensure that resources satisfy network performance parameter even when connectivity between network element 14A and controller device 10 is lost, which may help to improve a performance (e.g., reduce an amount of jitter, reduce an amount of latency, increase an amount of bandwidth, increase a reliability, etc.) of network 2.

Figure 2:
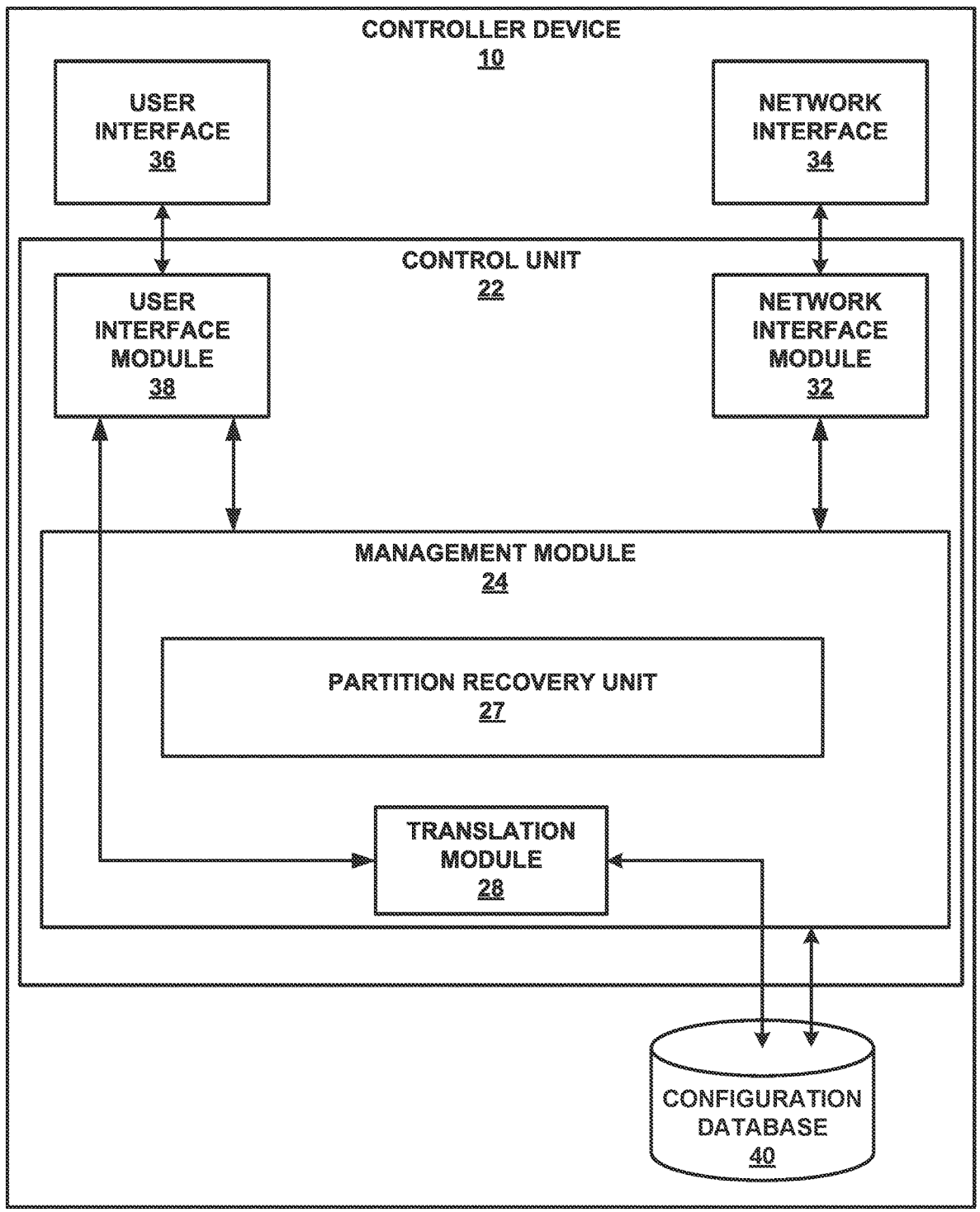
FIG. 2 is a block diagram illustrating an example set of components for the controller device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of network elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

Control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., network elements 14 of FIG. 1. Management of a network device includes, for example, configuring the network devices according to instructions received from a user (e.g., administrators 12 of FIG. 1) and providing the user with the ability to submit instructions to configure the network devices. Management of a network device further includes upgrading the network device with updated software, such as an updated software image. In this example, management module 24 further includes partition recovery unit 27 and translation module 28.

Management module 24 is configured to receive intent unified-graph-modeled configuration data for a set of managed network devices from a user, such as administrators 12. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 also includes configuration database 40. Configuration database 40 may include a data structure describing managed network devices, e.g., network elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent data model, or in some cases, both intent data model and low-level configuration information) for the managed devices (e.g., network elements 14). Configuration database 40 may include a database that comprises a unified intent data model. In some examples, configuration database 40 may store a low level configuration that includes, for each respective owned resource of a set of owned resources, a pointer indicating an owner for the respective owned resources of network elements 14.

Management module 24 may maintain a data structure in configuration database 40. The data structure may include a plurality of vertices and a plurality of edges, each vertex of the plurality of vertices representing a respective network device of a plurality of network devices (e.g., network elements 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Partition recovery unit 27 may be configured to receive a version number for a configuration at a resource (e.g., a resource provided by network element 14A). Partition recovery unit 27 may compare the version number output by the resource and the configuration number for the configuration stored by partition recovery unit 27. Partition recovery unit 27 may output a request for the configuration from the resource based on the comparison. For example, partition recovery unit 27 may output the request for the configuration from the resource when the version number output by the resource and the configuration number for the configuration stored by partition recovery unit 27 are different.

Partition recovery unit 27 may receive the configuration form the resource and update the configuration for the resource stored at partition recovery unit 27 based on the received configuration from the resource. For example, partition recovery unit 27 may set the configuration for the resource stored at partition recovery unit 27 to match the received configuration from the resource. Partition recovery unit 27 may update the version number for the configuration stored by partition recovery unit 27 based on received version number from resource. For example, partition recovery unit 27 may set the version number for the configuration stored by partition recovery unit 27 to match the received version number from resource. As such, network element 14A may move the configuration generated by controller device 10 without managing stateful intents and/or a unified graph model, which may require a relatively high computational capacity. In this way, an edge controller of network element 14A may be implemented using lightweight stateless edge controllers.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure network elements 14 by interacting with controller device 10 through the REST client.

Management module 24 may model configuration database 40 as a graph database representing YANG configuration data elements. YANG specifies various types of data structures, including lists, leaflists, containers, containers with presence, and features. Management module 24 may model each of lists, containers, containers with presence, and features, as well as a top-level container, as vertices in a graph database. Alternatively, configuration database 40 may represent YAML configuration data elements.

After constructing a graph database, management module 24 may perform operations on data of the graph database. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github-.com/tinkerpop/gremlin/wiki. Management module 24 may execute conditions mapped to vertices and edges of the graph database if the condition attributes are changed. In response to the conditions, management module 24 may process additional changes, handled as functions as discussed in greater detail below. Management module 24 may further update all changes in transaction semantics.

Figure 3:
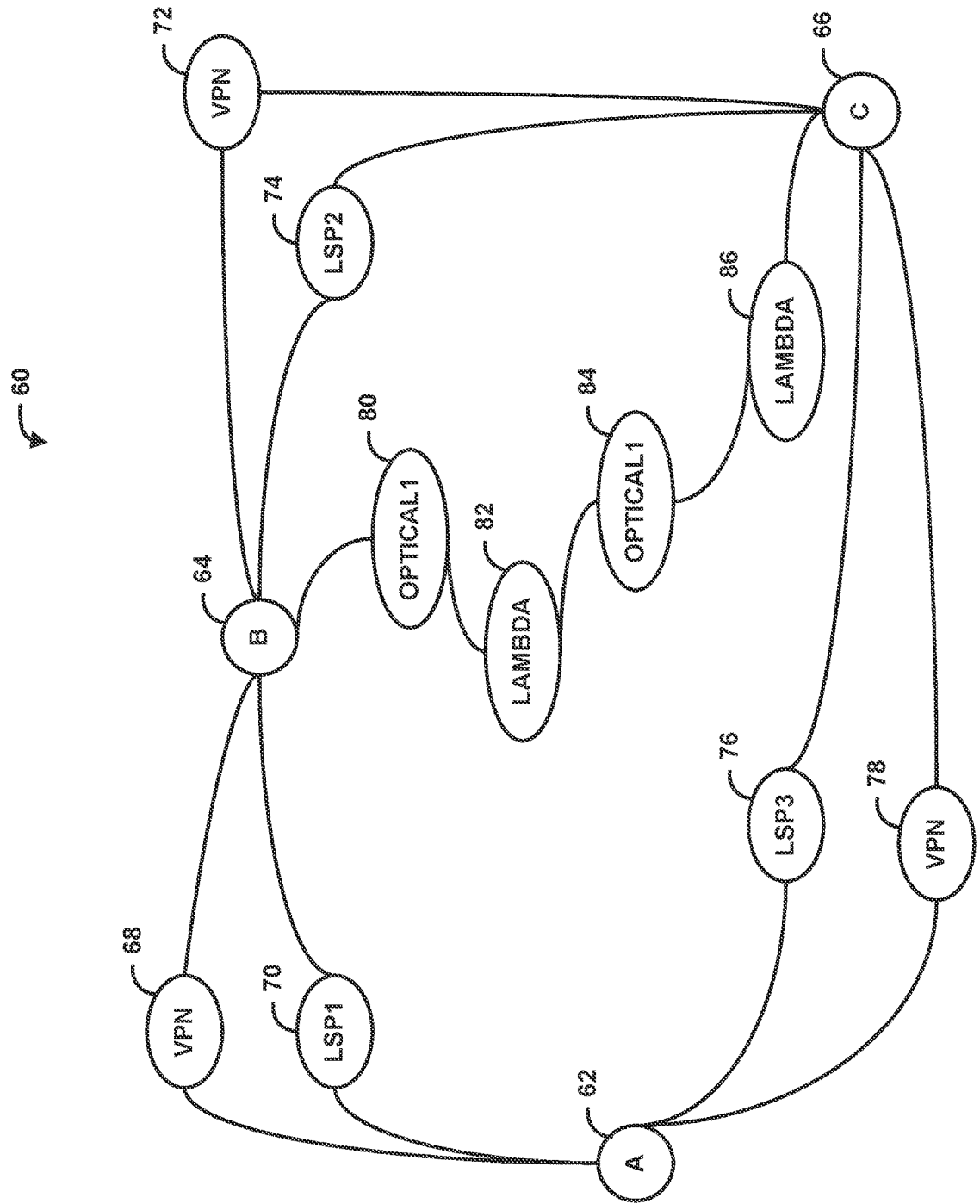
FIG. 3 is a conceptual diagram illustrating an example unified graph model for an intent data model.

FIG. 3 is a conceptual diagram illustrating an example unified graph model 60 for an intent data model. The process illustrated in FIG. 3 may represent an example of how controller device 10 may generate an intent-generated configuration. Unified graph model 60 may be an example of a data structure stored by configuration database 40 of FIG. 2. Unified graph model 60, in this example, includes nodes A 62, B 64, and C 66, among others, which may represent respective network devices (e.g., network elements 14). As shown, unified graph model 60 may include edges defining relationships between the plurality of nodes A 62, B 64, and C 66. For instance, edges connecting node B 64 and node C 66 via LSP2 may define an RSVP LSP between node B 64 and node C 66.

Initially, unified graph model 60 may not include VPN 68, VPN 72, and VPN 78, nor optical 80, lambda 82, optical 84, and lambda 86. As a result of modifications through intent data model updates, node A 62 is coupled to node B 64 via VPN 68 and LSP1 70, node B 64 is coupled to node C 66 via VPN 72 and LSP2 74, and node C 66 is coupled to node A 62 via VPN 78 and LPS3 76. Furthermore, as a result of additional capacity being required as an optical intent, additional nodes optical 80, lambda 82, optical 84, and lambda 86 are added between node B 64 and node C 66.

Stateful business policies can be written on top of a stateless intent layer. For example, a user may state the intent "provide high bandwidth VPN connectivity between sites A, B, and C with bandwidth between A-B, B-C, C-A, . . . ." This may lead to various stateless intents. The stateful intent may be compiled into a L3VPN (overlay tunnel) and a transport mechanism between A-B, B-C, C-A that provides the bandwidth required. For example, the transport mechanism may include an RSVP LSP between A-B with 30 Mbps, an RSVP LSP between B-C with 50 Mbps, and an RSVP LSP between C-A with 80 Mbps. In this instance, the RSVP-LSP between C-A with 80 Mbps may need to be created. There could be a situation where more capacity is required, so there may yet be a further intent "optical intent: increase capacity between C-A." If there is already a 70 Mbps connection for C-A, the stateless intent may provision a new 10G lambda between C-A on an optical network.

When realizing stateful intents, a controller device, such as controller device 10, may need to account for existing stateless intents across endpoints, as well as the current state. In the above example, to perform the various intents, controller device 10 may query a connected graph (including stateless intents) and create/modify the stateless intents, as necessary. Techniques related to using unified graph models and intents are described in U.S. application Ser. No. 15/462,465, filed Mar. 17, 2017, which is incorporated by reference in its entirety. Thus, intent data models can be represented using unified graph models. When more use cases are added, the intent data model (i.e., the unified graph model) can be extended. Also, use of unified graph models allows for retrieval of intents based on endpoints (e.g., by querying the graph).

Figure 4:
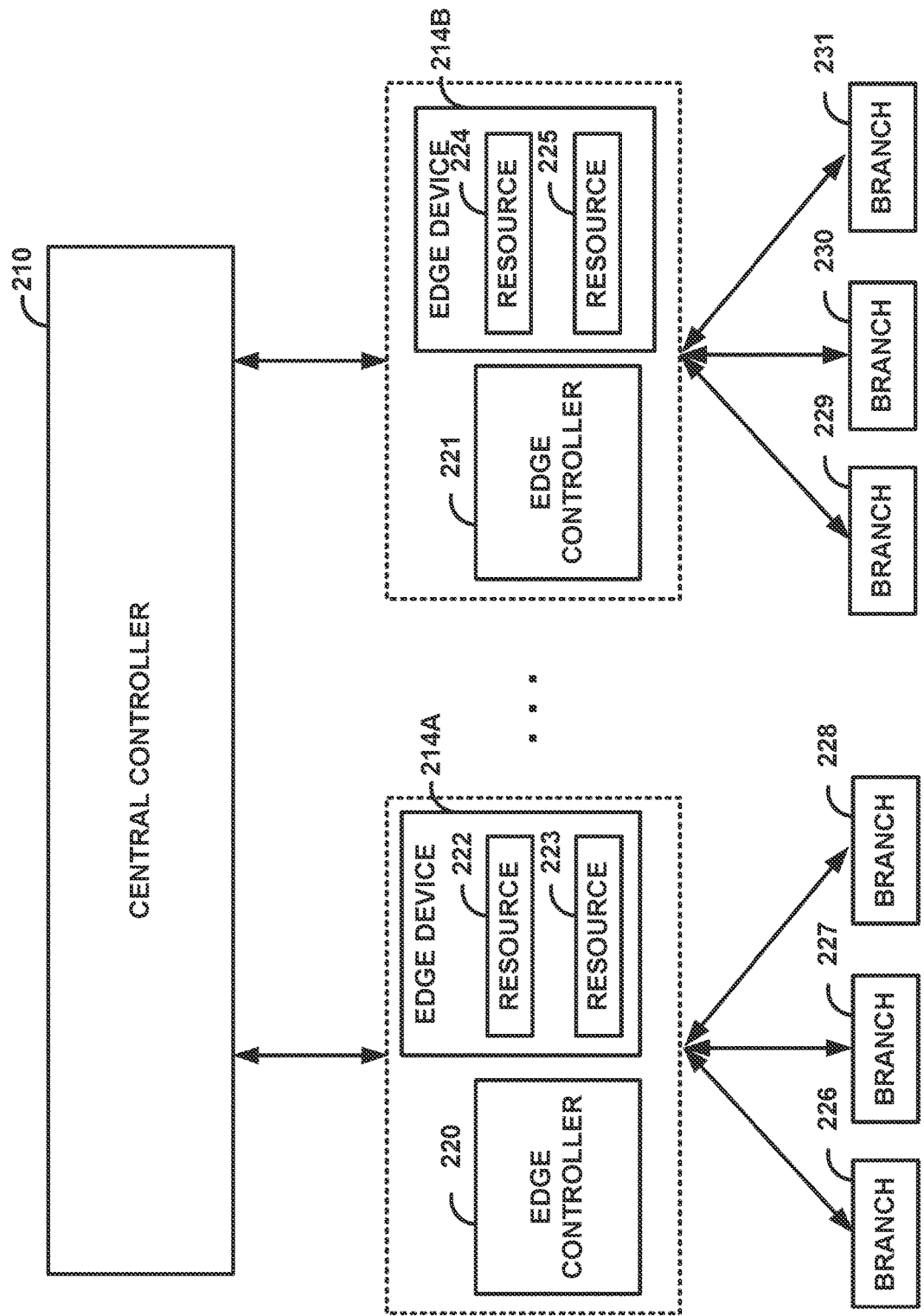
FIG. 4 is a conceptual diagram illustrating an example controller device and edge devices for ensuring that provisioned resources satisfy network performance parameters, in accordance with the techniques of the disclosure.

FIG. 4 is a conceptual diagram illustrating an example controller device and edge devices 214A-214B (collectively, "edge devices 214") for ensuring that provisioned resources satisfy network performance parameters, in accordance with the techniques of the disclosure. Central controller 210 may be an example of controller device 10 of FIG. 1. Although FIG. 4 illustrates two edge devices, central controller 210 may be connected to more than two edge devices or only one edge device. Edge devices 214 may represent examples of some of network elements 14 of FIG. 1. Edge controllers 220, 221 may be separate machines and/or virtual machines configured to manage edge devices 214 and/or one or more virtual machines (e.g., virtual routers). While some examples refer to edge controller 220, such examples may apply additionally, or alternatively, to edge controller 221 and/or to other edge controllers.

Central controller 210 (e.g., using centralized cloud management software implemented in circuitry) may provide a management plane for one or more network performance parameters. Central controller 210 may be configured to allow service subscriptions, intent policies, and/or intent SLA subscriptions.

Edge device 214A may include resource 222 and resource 223. Similarly, edge device 214B may include resource 224 and resource 225. Although edge devices 214 are shown to each include two resources, edge devices 214 may include more than two resources. Moreover, edge devices 214 may include a different number of resources. For instance, edge device 214A may include 'n' number of resources and edge device 214B may include 'm' number of devices, where m and n are different.

Edge controllers 220 and 221 may receive "intelligence" from central controller 210 and may provide data plane management. For example, central controller 210 may select resources, compile a stateful intent using a unified graph model, and generate a configuration to be applied to resources. The data plane management may be served by individual network devices, which may be implement resources 222-225. Networking services (e.g., customer networking services) provided by edge device 214A and/or edge device 214B could be provided by virtualized devices (e.g., a vRouter or a virtual security appliance (vSRX)).

Edge controllers 220 and 221 may provide headless mode support. As used herein, headless mode support may comprise edge controllers 220, 221 moving a configuration from one resource to another resource when the edge controller is unable to communicate with the central controller (e.g., headless mode"). Again, the configuration may configure the resource to perform network services for client devices (e.g., client devices at branches 226-231). In some examples, each branch of branches 226-231 may represent a different geographical site. For example, branch 227 may represent one or more client devices in a second geographical location and branch 226, where the first geographical location is geographically remote from the second geographical location. For example, a connectivity issue (e.g., loss of connection, relatively high latency, relatively low bandwidth, etc.) may occur between central controller 210 and edge controller 220, as both may be deployed in different geographical locations.

During the connectivity issue between central controller 210 and edge controller 220, the data planes between edge controller 220 and client devices of branches 226-228 may not be impacted. That is, edge device 214A may provide services to client devices of branches 226-228 during the connectivity issue between central controller 210 and edge controller 220. As such, resources 222, 223 may provide network services (e.g., SLA for customer traffic) during the connectivity issue between central controller 210 and edge controller 220. However, during headless mode, central controller 210 may not initiate actions to ensure that the network performance parameters are satisfied. In accordance with the techniques of the disclosure, edge controller 220 may itself initiate actions to ensure that the network performance parameters are satisfied. For example, edge controller 220 may initiate SLA actions to move a configuration for services (e.g., virtual routing, computing services, etc.) from resource 222 to resource 223 to help to ensure that the network performance parameters are satisfied. As used herein, an SLA action may refer to moving network services between resources when a network services parameter (e.g., an SLA) is not met for customer traffic. While SLA actions may be discussed with respect to SLA parameters, edge controller 220 may be configured to apply actions with respect to other network performance parameters.

Edge controller 220 and central controller 210 may be configured to address one or more of: network performance parameter (e.g., SLA) management for headless mode, stateless edge controller support, fault tolerance, or another issue. During network performance parameter (e.g., SLA) management for headless mode, a connectivity issue may occur between central controller 210 and an Edge POP provided by edge controller 220, as central controller 210 and edge controller 220 may be deployed in different geographical locations. For example, edge controller 220 may be geographically proximate to edge device 214A and geographically remote from central controller 210. During the connectivity issue between central controller 210 and edge controller 220, the data planes may not be impacted. However, during headless mode, central controller 210 may not initiate actions to ensure that the network performance parameters are satisfied. In accordance with the techniques of the disclosure, edge controller 220 may initiate actions to ensure that the network performance parameters are satisfied. For example, edge controller 220 may initiate SLA Actions to move a configuration for network services (e.g., virtual routing, computing services, etc.) from resource 222 to resource 223 to help to ensure that the network performance parameters are satisfied.

Edge controller 220 may be configured for stateless edge controller support. For example, edge controller 220 may be stateless and get intelligence (e.g., a configuration derived from a stateful intent) from the central controller 210. For instance, controller device 10 may be configured to select resources, compile a stateful intent (e.g., a network performance parameter), and generate, using a unified graph model, a configuration to be applied to resources (e.g., a network element) that satisfies the intent and edge controller 220 may apply the configuration to resource 222 without using a stateful intent and/or unified graph model.

Edge controller 220 may be configured for fault tolerance. That is, edge controller 220 may be configured to provide an approach for CAP properties, which may refer to data consistency, availability, and partition tolerance between central controller 210 and edge controller 220. Data consistency may refer to providing data such that the data is consistent across central controller 210 and edge controller 220. Edge controller 220 may be configured to provide data consistency when there is partition as described below.

With partition tolerance, edge devices 214 may be deployed close to customers (e.g., client devices of branches 226-231, and central controller 210 may be deployed at a central location. In this example, edge devices 214 may operate despite connectivity or messages being lost between edge controllers 220, 221 and central controller 210 (e.g., headless mode). With partition tolerance, edge controller 220 may, once connectivity is established between edge controller 220 and central controller 210, synchronize. For example, edge controller 220 may move a set of services from resource 222 to resource 223 during headless mode. To synchronize, edge controller 220 may output, to central controller 210, an indication that the set of services from resource 222 to resource 223. In this way, central controller 210 may update the graph model to specify that the set of services are provided by resource 223.

Edge devices 214 should be configured to provide a high availability, irrespective of failures. That is, data planes (e.g., services provided by resources 222-225) should be available even when the system is partitioned (e.g., headless mode). Edge controllers 220, 221 may provide SLA management even when there is partition (e.g., headless mode). As used herein, SLA management may refer to a process to provide service level agreements based on customer subscribed properties.

In general, controllers (e.g., central controller 210 and/or edge controllers 220, 221) may provide the following functionality to provide network services. The controllers may manage data a model for tenants, a solution model, and/or tenant specific services. The controllers may orchestrate services (e.g., policies and tunnels) on the resources. The controllers may perform SLA management, such as, for example, monitoring resources (e.g., resources 222-225) and take SLA actions based on a SLA policy and/or taking SLA action to re-provision the network. In some controller scenarios, the controller may provision network devices and update the internal states.

In accordance with the techniques of the disclosure, central controller 210 may manage the data model for tenants, a solution model, and/or tenant specific services. Central controller 210 may orchestrate edge resources (e.g., resources 222-225) for the services and/or provide resource capacity planning. Edge Controllers 220, 221 may be lightweight and provide health management of resources and/or SLA management. In some examples, edge controllers 220, 221 may provide fault tolerance, for example, by providing eventual consistency, availability, and/or partition tolerance.

Central controller 210 may generate a policy configuration and tunnels on edge network devices 214 based on customer subscribed services and/or network performance parameters (e.g., SLA parameters). The service configuration per customer branch/site may be "namespaced" on a resource. For example, each service configuration per customer branch of branches 226-231 may include a "Config-group."

Based on a stateful intent (e.g., the customer SLA policy), central controller 210 may provide the network performance parameters, such as, for example, SLA parameters (e.g., resource context and optimization parameters) to edge controllers 220, 221. Edge controllers 220, 221 may manage the network performance parameters. For example, edge controllers 220, 221 may provide the SLA management.

Edge controllers 220, 221 may perform actions (e.g., SLA actions). Edge controllers 220, 221 may move a configuration for services across resources 222-225 through a tenant and branch namespace (e.g., config-groups). For example, edge controller 220 may move a configuration for services comprising a config-group for a first tenant and branch 226 between resource 222 and resource 223.

Central controller 210 and edge controllers 220, 221 may manage network performance parameters (e.g., perform SLA management). The management of network performance parameters may include service-to-resource mapping and/or configuration regeneration deployment capabilities. Central controller 210 may read the service-to-resource mapping from datastores of central controller 210. In headless mode, central controller 210 may read the service-to-resource mapping from resources 222-225 (e.g., see FIG. 5). After headless mode, the service-to-resource mappings may be synchronized from resources.

Central controller 210 may perform configuration regeneration and deployment. The configuration on the resources may be logically separated through Config-groups. Edge controllers 220, 221 may include a lightweight configuration client that can move the configuration across devices through logical groups. In some examples, edge controllers 220, 221 may not be configured to determine semantics of the configuration. For instance, edge controllers 220, 221 may be lightweight and/or configured to implement stateless configuration and not stateful intent.

In some examples, central controller 210 may maintain the service-to-resource mapping state. In some examples, resources 222-225 may maintain the service-to-resource mapping state. Resources 222-225 may contain metadata of the services, for example, using a tenant and/or branch namespace in configuration (e.g., config-groups).

Central controller 210 may change the service-to-resource mapping when network services (e.g., service SLA properties) are changed. Edge controllers 220, 221 may change the service-to-resource mapping (e.g., as part of SLA management), when one or more of resources 222-225 are not meeting network performance parameters (e.g., customer SLA requirements).

Edge controllers 220, 221 may perform actions (e.g., SLA actions). For example, edge controllers 220, 22 may move a configuration for services across resources 222-225 through a tenant namespace in configuration (e.g., config-groups).

Figure 5:
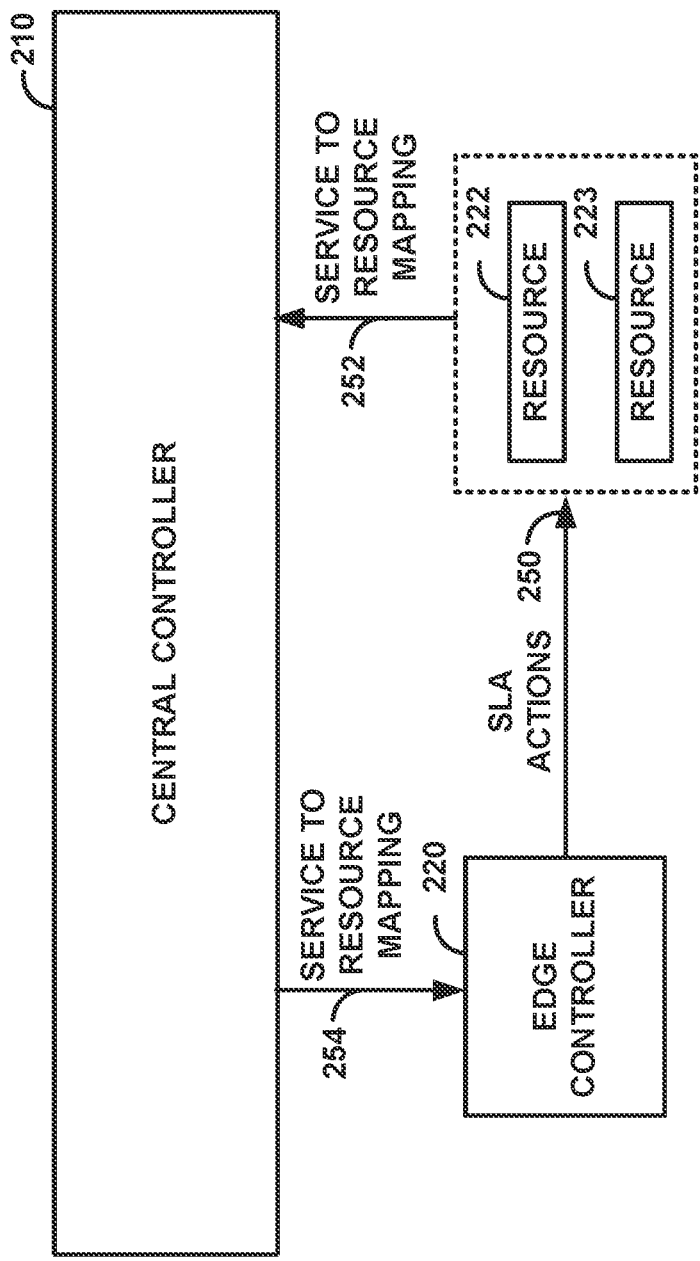
FIG. 5 is a conceptual diagram illustrating an example state flow for ensuring that provisioned resources satisfy network performance parameters, in accordance with the techniques of the disclosure.

Central controller 210 and edge controllers 220, 221 may perform resynchronization steps to synchronize the state across central controller 210 and edge controllers 220, 221 to achieve consistency as shown in FIG. 5.

FIG. 5 is a conceptual diagram illustrating an example state flow for ensuring that provisioned resources satisfy network performance parameters, in accordance with the techniques of the disclosure. While the example of FIG. 5 refers to edge controller 220, the process performed by edge controller 220 may be performed by all edge controllers (e.g., edge controller 221).

Central controller 210 and edge controller 220 may perform fault tolerance. For example, central controller 210 and edge controller 220 may be configured for partition tolerance, which may include instances where communication is disrupted between central controller 210 and edge controller 220 (e.g., headless mode) as follows. Edge controller 220 may, when partitioned (e.g., during headless mode), provide network performance parameters (e.g., SLA parameters) by, for example, moving a configuration for customer services across resources 222-225 and/or launch a new resource and move the configuration for the customer services to the new resource (250).

Central controller 210 may be available, though edge controller 220 may be partitioned from central controller 210. For example, central controller 210 may be configured to allow customers to add new policies and/or update policies. However, the configuration for the network services may be provisioned, once resources 222, 223 (e.g., network devices) are connected to central controller 210.

In the example of FIG. 5, central controller 210 and edge controller 220 may perform partition recovery. When edge controller 220 is reconnecting to central controller 210, central controller 210 may synchronize (252) the service-to-resource mappings from resources 222, 223 (e.g., network devices). Central controller 210 may not provision the policy changes, until central controller 210 synchronizes the resource. For example, central controller 210 may use a configuration version capability on resources 222, 223 to determine whether to synchronize the service-to-resource mappings from resources 222, 223. Central controller 210 may check if the network device version of the service-to-resource mappings is different from the controller version of the service-to-resource mappings to detect if the service-to-resource mappings are out-of-synch. If the service-to-resource mappings are out-of-synch, central controller 210 may synchronize the service-to-resource mappings (e.g., set the service-to-resource mappings stored by central controller 210 to the service-to-resource mappings of resources 222-225) based on logical groups in configuration (e.g., config-groups). Central controller 210 may change the service-to-resource mapping using the service-to-resource mapping from resources 222, 223 (254). For instance, central controller 210 may be configured to synchronize one or more service-to-resource mappings stored by central controller 210 with resource 223 in response to determining that a version number output by resource 223 does not match a corresponding version number for resource 223 that is stored by central controller 210.

Figure 6:
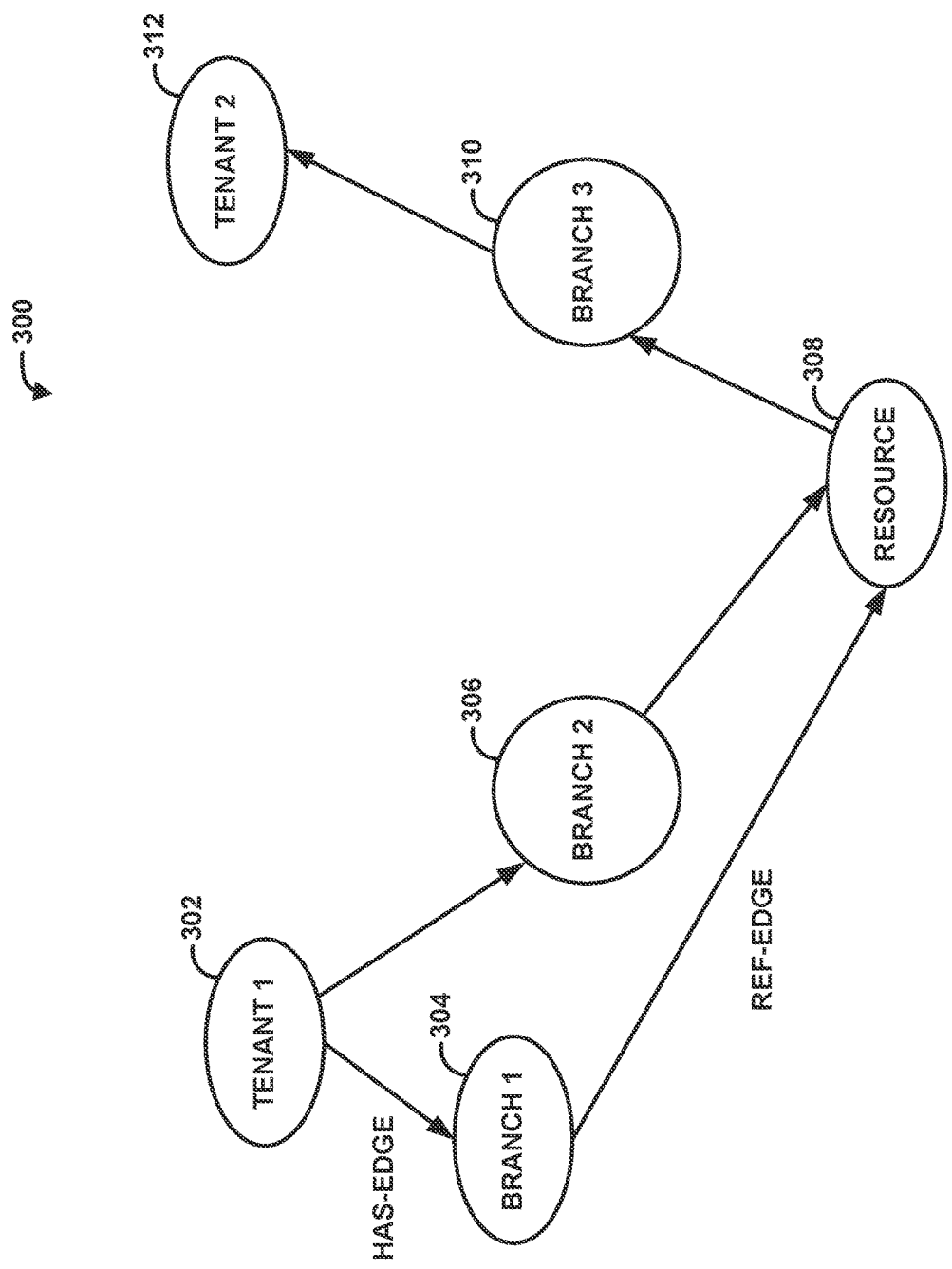
FIG. 6 is a conceptual diagram illustrating an example graph model, in accordance with the techniques of the disclosure.

FIG. 6 is a conceptual diagram illustrating an example graph model 300, in accordance with the techniques of the disclosure. Central controller 210 may generate a controller model, for example, graph model 300. Central controller 210 may model controller data in graph model 300. Centralized Controller 210 may manage a tenant and solution data model. The tenant and solution data model may include a tenant, network services (e.g., subscribed services) per customer branch with network performance parameters (e.g., SLA properties), and/or an edge resource (e.g., network devices providing resources 222-225) providing the network service to the customer branch (e.g., branches 226-231).

Graph model 300 may include two types of edges (e.g., arcs) between vertices/resources, which may include a reference-edge and a parent-child-edge. The reference-edge may create the reference edge between two resources. In some examples, a referrer object may include a ref property. The parent-child edge and/or a contains edge may create the parent-child edge between the parent and child resources. In some examples, the parent object includes a children property. In some examples, a resource fully qualified (FQ) name includes the parent FQ-Name.

In the example of FIG. 6, graph model 300 may represent Branch1 FQ-name::Tenant1: Branch1 where branch 304 ("branch 1") references tenant 302 ("tenant 1") and includes FQ-name, which may refer to a subscribed service. Similarly, graph model 300 may represent Branch2 FQ-name:: Tenant1: Branch2 where branch 306 ("branch 2") references tenant 302 ("tenant 1") and includes FQ-name, which may refer to a subscribed service. In this example, graph model 300 may represent Branch3 FQ-name::Tenant2: Branch3 where branch 310 ("branch 1") references tenant 312 ("tenant 2") and includes FQ-name, which may refer to a subscribed service. In this example, branches 304, 306, 310 use network services provided by resource 308.

Central controller 210 may perform service-to-resource mapping. For example, a resource (e.g., a network device) present in an edge device may be modeled in central controller 210 using graph model 300. Branches 304, 306, and 310 may be associated with a resource (e.g., a network device) based on network performance parameters (e.g., SLA properties). In an edge controller (e.g., edge controller 220, 221), a same resource may provide network services for multiple branches and/or customer endpoints. Branches may have a reference association with the resources.

Central controller 210 may generate a network device configuration model for each resource. The resources may provide a NETCONF interface to manage the configuration on the resources. Central controller 210 may push each tenant associated configuration in a separate configuration group. In some examples, central controller 210 may generate the network device configuration with an indication of a version. When a configuration is changed, the version would be changed/incremented by the resource. Central controller 210 may maintain the version of the network device configuration stored by central controller 210.

Central controller 210 may output a resource allocation context to the resources. For example, central controller 210 may allocate services to resources based on optimization parameters (e.g., load balancing between resources). In some examples, central controller 210 may generate the resource allocation context to include one or more of a resource context, one or more resource optimization parameters, and/or a resource association constraint.

The resource context may include allocation information for a resource. For example, the resource context may include a tenant name, a service, and an FQ name (e.g., Tenant Service FQ-Name). The request optimization parameters may include one or more parameters on which a network performance parameter (e.g., SLA property) is measured.

The resource association constraint may indication one or more constraints for moving a configuration for network services. For example, in some deployments, a resource cannot provide multi-tenancy, where the resource may only provide services to up to one tenant. Central controller 210 and the edge controller may assign the resources based on whether a resource cannot provide multi-tenancy. The resource association constraint may be a hierarchical request path. The hierarchical request path can be an FQ-Name of a branch. The hierarchical request path may signify the resource allocation constraints. For example, the hierarchical request path may be as follows.

Request 1: Tenant1.Branch1
Request 2: Tenant2. Branch5
Request 3: Tenant1.Branch2

In this example, the edge controllers (e.g., edge controllers 221, 222) may provide network services for Request1 and Request3 using a first resource. However, the edge controllers may be configured to provide network services for Request2 by a second resource that is different than the first resource.

Central controller 210 may provide service orchestration. For example, central controller 210 may orchestrate the configuration on network devices based on policies (e.g., stateful intent). Central controller 210 may push the configuration for services in a separate group. For instance, the configuration group name may be "Tenant Service FQ-Name". Central controller 210 may orchestrate the configuration within the "Tenant Service config group" based on tenant requirements (e.g., resource association constraint). An example configuration is as follows.

```
Configuration {
    group Customer1.Bangalore.SecurityService {
        // Services, Policies config
    }
    apply-groups Customer1..Bangalore;
}
```

Figure 7:
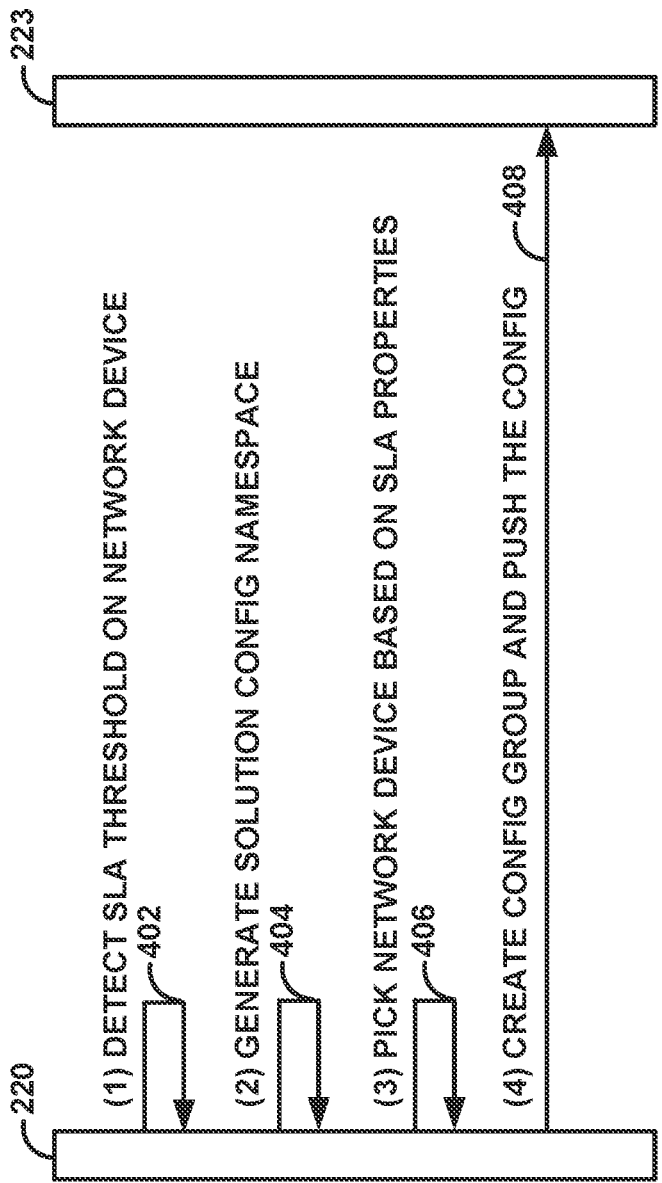
FIG. 7 is a conceptual diagram illustrating an example process for ensuring that provisioned resources satisfy network performance parameters, in accordance with the techniques of the disclosure.

FIG. 7 is a conceptual diagram illustrating an example process for ensuring that provisioned resources satisfy network performance parameters, in accordance with the techniques of the disclosure. While the example of FIG. 7 refers to edge controller 220, the process performed by edge controller 220 may be performed, alternatively, or additionally, by one or more other edge controllers (e.g., edge controller 221).

Edge Controller 220 may be lightweight and be configured to provide the health management of resources. Edge Controller 220 and resource 223 may be configured to provide SLA management. Based on a customer SLA policy, a central controller (e.g., central controller 210) may provide SLA parameters (e.g., resource context and optimization parameters) to edge controller 220. Edge controller 220 may provide the SLA management.

Edge controller 220 may provide SLA actions as follows. Edge controller 220 may derive the solution configuration namespace based on a resource allocation context. Based on the resource allocation context (e.g., resource optimization parameters), edge controller 220 (e.g., with management software executed by edge controller 220) may move a configuration for services for a branch across resources based on a configuration namespace. Edge controller 220 may orchestrate the resources for network services based on a resource allocation context.

Edge controller 220 may be configured for partition tolerance. Edge controller 220 may be deployed geographically close to branches for customers and central controller 210 may be deployed on different clouds. In this example, edge controller 220 may continue to operate despite the connectivity or messages being lost between edge controller 220 to central controller 210 (e.g., headless mode may be supported at edge controller 220). In this example, when the network performance parameter is not met for a customer, edge controller 220 may move a configuration for network services for a particular customer site workload/services to another resource (e.g., a new resource or an existing resource). For example, if the network performance parameter (e.g., a customer SLA) is not met, edge controller 220 may identify another resource. In this example, edge controller 220 may derive the solution configuration namespace based on resource allocation context, which may be provided by central controller 210. Edge controller 220 may generate a "Config-Group" request based on the solution configuration namespace. Edge controller 220 may fetch the corresponding configuration from a resource currently assigned to provide the services (e.g., an existing resource). In this example, edge controller 220 may move the configuration to another resource (e.g., a new resource).

Edge controller 220 may provide the network services (e.g., SLA) for customer traffic even when connectivity is not present between edge controller 220 and central controller 210. Central controller 210 may provide high availability (HA). If the connectivity is not present between central controller 210 and edge controller 220, central controller 210 may add new branches and/or policies. These requests would be served as soon as edge controller 220 has completed moving services from a resource to another resource. Central controller 210 may maintain the service-to-resource mapping states as configured and as deployed. Once the configured service-to-resource mappings are provisioned, central controller 210 may move the states to the deployed configuration.

Edge controller 220 may be configured to provide high availability (HA). If the connectivity is not present between central controller 210 and edge controller 220, edge controller 220 may operate in headless mode. For example, edge controller 220 may provide the management (e.g., SLA management) for the branches.

In the example of FIG. 7, edge controller 220 may detect an SLA threshold on a network device (402). For example, edge controller 220 may determine that resource 222 provides an amount of bandwidth to branch 226 that is less than the SLA threshold bandwidth. Edge controller 220 may generate a solution configuration namespace (404). For example, edge controller 220 may determine to move a configuration for providing the bandwidth to branch 226 from resource 222.

Edge controller 220 may pick a network device based on the SLA properties (406). For example, edge controller 220 may pick resource 223 to provide the bandwidth to branch 226. In some examples, edge controller 220 may generate a new resource (e.g., a virtual router) to provide the bandwidth to branch 226. Edge controller 220 may create a configuration group and push the configuration (408). For example, edge controller 220 may move, using a configuration group, a set of configurations for providing the bandwidth to branch 226 from resource 222 to resource 223. In some examples, edge controller 220 may move, using a configuration group, a set of configurations for providing the bandwidth to branch 226 from resource 222 to a new resource.

Figure 8:
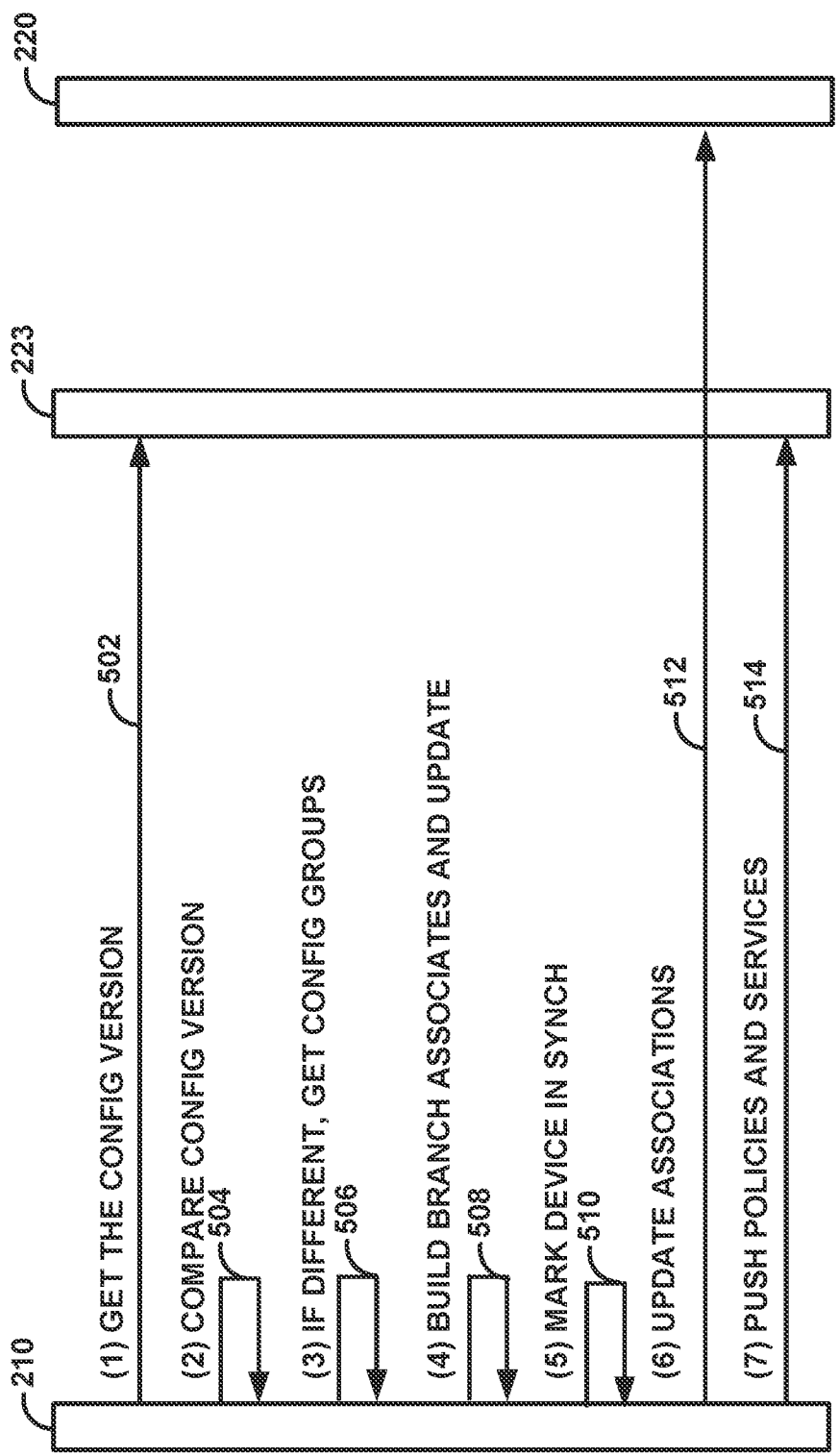
FIG. 8 is a conceptual diagram illustrating an example process for resynchronization of a state, in accordance with the techniques of the disclosure.

FIG. 8 is a conceptual diagram illustrating an example process for resynchronization of a state, in accordance with the techniques of the disclosure. While the example of FIG. 8 refers to edge controller 220, the process performed by edge controller 220 may be performed, alternatively, or additionally, by one or more other edge controllers (e.g., edge controller 221).

Central controller 210 and edge controller 220 may be configured for partition recovery. Once the partition is recovered (e.g., once connectivity has been restored between central controller 210 and edge controller 220), the state in central controller 210 and edge controller 220 may be resynched. As part of resyncing the state, central controller 210 may check if the configuration on the resources is the same as the version stored by central controller 210. That is, central controller 210 may get the configuration version from resource 223 (502). For example, central controller 210 may determine that the configuration on the resource is the same as the version stored by central controller 210 based on the configuration version of the resource. That is, central controller 210 may compare the configuration version of the configuration for network services stored in central controller 210 and the version of the configuration for network services stored by resource 223 (504). If version stored by central controller 210 and of the configuration version of the resource are different, central controller 201 may receive the associated config group names from resource 223 (506). Central controller 201 may build the service-to-resource mappings. That is, central controller 201 may build branch associations and update the service-to-resource mappings (508). Central controller 201 may compare the model in central controller 210 and resync. That is, central controller 201 may mark resource 223 in synch (510), update the branch associations (e.g., a service-to-resource mapping) (512) with edge controller 220, and push a configuration for policies and services to resource 223 (514).

Central controller 201 may be configured to deploy a controller state (e.g., policies and/or services). Central controller 210 may maintain network services and/or policy objects in a configured state. Central controller 201 may generate the configuration for these changes and deploy to one or more configurations at resources in edge devices 214.

In accordance with the techniques of the disclosure, central controller 210 and edge controllers 220, 221 may provide an approach to provide network services (e.g., SLA) in edge controller 220, 221 with resource constraint semantics. In some examples, central controller 210 and edge controllers 220, 221 may provide an approach to run light weight stateless edge controllers 220, 221 to support an edge environment. In some examples, central controller 210 and edge controllers 220, 221 may provide an approach to run edge controllers 220, 221 in headless mode without compromising consistency, availability, and/or a partition tolerance. In some examples, central controller 210 and edge controllers 220, 221 may provide an approach to run central controller 210 and edge controllers 220, 221 in different locations with consistency.

Figure 9:
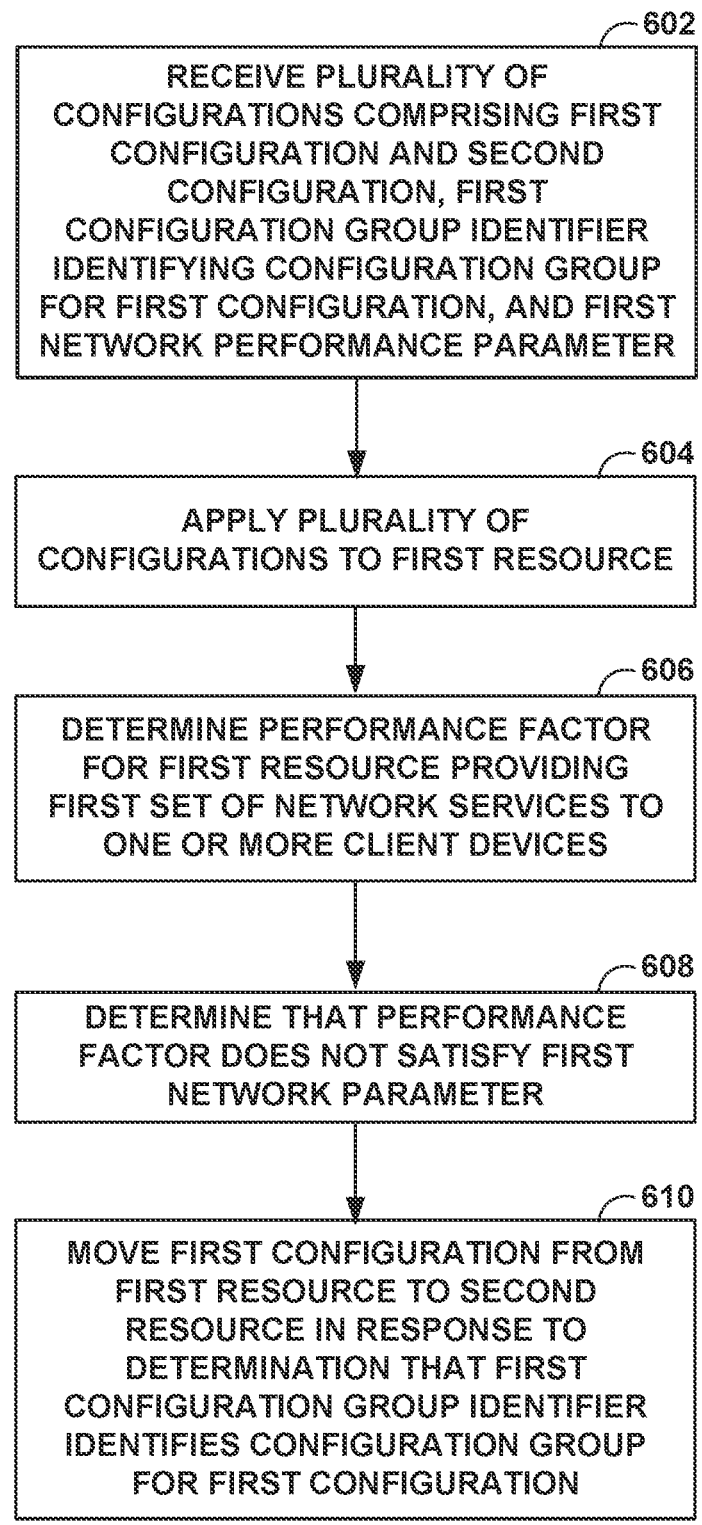
FIG. 9 is a flow chart illustrating an example process for ensuring that provisioned resources satisfy network performance parameters, in accordance with the techniques of the disclosure.

FIG. 9 is a flow chart illustrating an example process for ensuring that provisioned resources satisfy network performance parameters, in accordance with the techniques of the disclosure. FIG. 9 is discussed with reference to FIGS. 1-8 for example purposes only.

An edge controller (e.g., edge controllers 214) may receive, from a central controller (e.g., central controller 210), a plurality of configurations comprising a first configuration for provisioning a first set of network services at a first resource of an edge device and a second configuration for provisioning a second set of network services at the first resource, a first configuration group identifier identifying a configuration group for the first configuration, and a first network performance parameter for the configuration (602). The central controller may generate the plurality of configurations using a stateful intent. In some examples, the central controller may generate the plurality of configurations using a unified graph model. A configuration group identifier may include one or more of a tenant name or a branch name. For example, the first configuration group identifier may comprise a tenant name. In some examples, the first configuration group identifier may comprise a branch name for the one or more client devices.

The edge controller may apply the plurality of configurations at the resource (604). For instance, edge controller 220 may output a plurality of configurations at resource 222 and resource 222 applies the plurality of configurations. After applying the plurality of configurations to the first resource, the edge controller may determine a performance factor for the first resource providing the first set of network services to one or more client devices (606). For example, the edge controller may determine an amount of bandwidth between the first resource and the one or more client devices. For instance, edge controller 220 may determine an amount of bandwidth between resource 222 and one or more client devices at branch 226. In some examples, the edge controller may determine an amount of latency between the first resource and the one or more client devices. For instance, edge controller 220 may determine an amount of latency between resource 222 and one or more client devices at branch 226. In some examples, the edge controller may determine an amount of jitter between the first resource and the one or more client devices. For instance, edge controller 220 may determine an amount of jitter between resource 222 and one or more client devices at branch 226.

The edge controller may determine that the performance factor does not satisfy the first network performance parameter (608). For example, the edge controller may determine that the performance factor does not satisfy the first network performance parameter in response to a determination that an amount of bandwidth between the first resource and the one or more client devices is less than a bandwidth threshold specified by the performance factor. In some examples, the edge controller may determine that the performance factor does not satisfy the first network performance parameter in response to a determination that an amount of latency between the first resource and the one or more client devices is greater than a latency threshold specified by the performance factor. In some examples, the edge controller may determine that the performance factor does not satisfy the first network performance parameter in response to a determination that an amount of jitter between the first resource and the one or more client devices is greater than an amount of jitter threshold specified by the performance factor.

In response to a determination that the performance factor does not satisfy the first network performance parameter for the configuration group and that the first configuration group identifier identifies the configuration group for the first configuration, the edge controller may move the first configuration from the first resource to a second resource of the edge device based on receiving the first configuration group identifier for the first configuration (610). For example, the edge controller may remove the first configuration from the first resource and add the first configuration to the second resource.

In some examples, the edge controller may receive, from the central controller, a resource association constraint indicating one or more constraints for moving the first configuration. The edge controller may select the second resource based on the resource association constraint. For example, the edge controller may select the second resource instead of a third resource in response to determining that the third resource would provide network services to more than one tenant if the first configuration is moved to the third resource and that the third resource supports only one tenant and in response to determining that the second resource supports multi-tenancy.

In some examples, the edge controller may receive a second configuration group identifier identifying the configuration group for the second configuration that is the same configuration group for the first configuration. In this example, the edge controller may, in response to a determination that the performance factor does not satisfy the first network performance parameter for the configuration group and that the second configuration group identifier identifies the configuration group for the second configuration, move the second configuration from the first resource to the second resource of the edge device.

In some examples, the edge controller may receive a second configuration group identifier identifying a second configuration group for the second configuration that is different from the first configuration group for the first configuration. In this example, the edge controller may refrain from moving the second configuration from the first resource to the second resource of the edge device in response to determining the second configuration group identifier identifies the second configuration group for the second configuration. In this example, the edge controller may receive a second network performance parameter for a second configuration group indicated by the second configuration group identifier. After applying the plurality of configurations to the first resource, the edge controller may determine a second performance factor for the first resource providing the second set of network services to one or more second client devices. In response to a determination that the second performance factor does not satisfy the second network performance parameter and that the second configuration group identifier identifies the second configuration group for the second configuration, the edge controller may move the second configuration from the first resource to the second resource of the edge device. In response to the determination that the second performance factor does satisfy the second network performance parameter and that the second configuration group identifier identifies the second configuration group for the second configuration, the edge controller may refrain from moving the second configuration from the first resource to the second resource of the edge device.

In some examples, a resource may update a version number for the plurality of configurations in response to moving the first configuration from the first resource to the second resource. For example, the first resource may increment a version number for a plurality of configurations at the first resource in response to removing the first configuration from the first resource. In some examples, the second resource may increment a version number for the plurality of configurations at the second resource in response to adding the first configuration to the second resource. In this example, the resource may output, to the central controller, an indication of the version number.

In some examples, the edge controller may move the configuration in headless mode. For example, the edge controller may initiate the move of the configuration without communication with the central controller (e.g., central controller 210). The edge controller may initiate the move of the configuration when the edge loses connectivity with the central controller.

Client devices may be geographically arranged at different branches (also referred to herein as "sites"). For example, one or more first client devices may be assigned to a first branch (e.g., branch 226). In this example, one or more second client devices may be assigned to a second branch (e.g., branch 227). In this example, to apply the plurality of configurations, the edge controller may apply the first configuration to the first resource to cause the first resource to provide the first set of network services to the one or more first client devices and apply the second configuration to the first resource to cause the first resource to provide the second set of network services to one or more second client devices assigned to a second branch. Again, the first branch may correspond to a geographical location different from the second branch. In some examples, the first branch and the second branch are assigned to a common tenant. For instance, the first branch may comprise one or more first client devices in a first office location for a tenant and the second branch may comprise one or more second client devices in a second office location for the tenant. In some examples, however, the first branch and the second branch are assigned to different tenants.

In some examples, the edge device is geographically closer to the one or more client devices than the central controller. For example, the edge device may be arranged on an "edge" of a network that is closest to the one or more client devices than other edge devices of the network and the central controller.

A resource may be a virtualized device or a network device. For example, the first resource may comprise a virtualized device (e.g., a virtual router). In some examples, the first resource may comprise a network device managed by the edge controller. For instance, the first resource may comprise a server configured to provide network services relating to providing computes to the one or more client devices. In some instances, the first resource may comprise a physical router or physical switch configured to provide networking services relating to network packet routing (e.g., a firewall).

Figure 10:
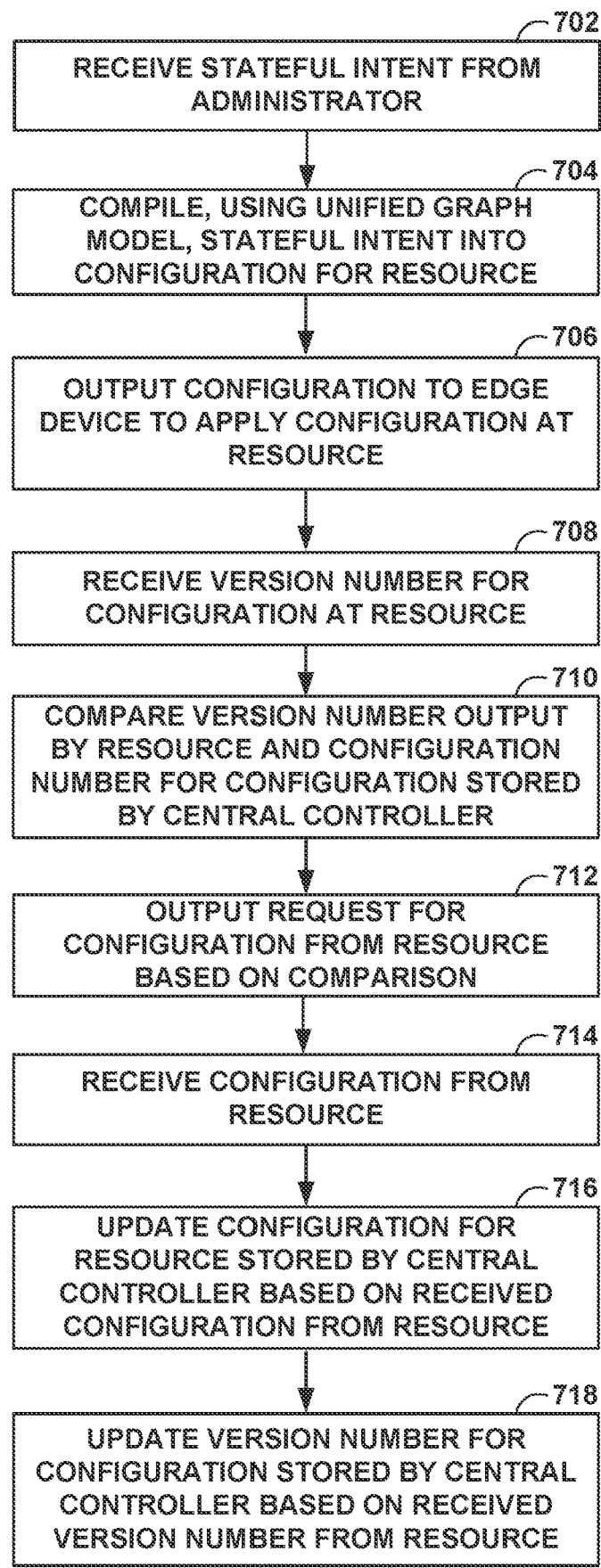
FIG. 10 is a flow chart illustrating an example process for a central controller, in accordance with the techniques of the disclosure.

FIG. 10 is a flow chart illustrating an example process for a central controller, in accordance with the techniques of the disclosure. FIG. 10 is discussed with reference to FIGS. 1-9 for example purposes only.

A central controller (e.g., central controller 210) may receive a stateful intent from an administrator (702). The central controller may compile, using a unified graph model, the stateful intent into a configuration for a resource (704). In some examples, the central controller may generate a version number for the configuration. The central controller may output the configuration to an edge controller (e.g., edge controller 220) to apply the configuration at a resource (706). In some examples, the central controller may output the version number for the configuration.

The central controller may receive a version number for the configuration at the resource (708). The central controller may compare the version number output by the resource and the configuration number for the configuration stored by the central controller (710). The central controller may output a request for the configuration from the resource based on the comparison (712). For example, the central controller may output the request for the configuration from the resource when the version number output by the resource and the configuration number for the configuration stored by the central controller are different.

The central controller may receive the configuration form the resource (714) and update the configuration for the resource stored at the central controller based on the received configuration from the resource (716). For example, the central controller may set the configuration for the resource stored at the central controller to match the received configuration from the resource. The central controller may update the version number for the configuration stored by central controller based on received version number from resource (718). For example, the central controller may set the version number for the configuration stored by central controller to match the received version number from resource.

Figure 11:
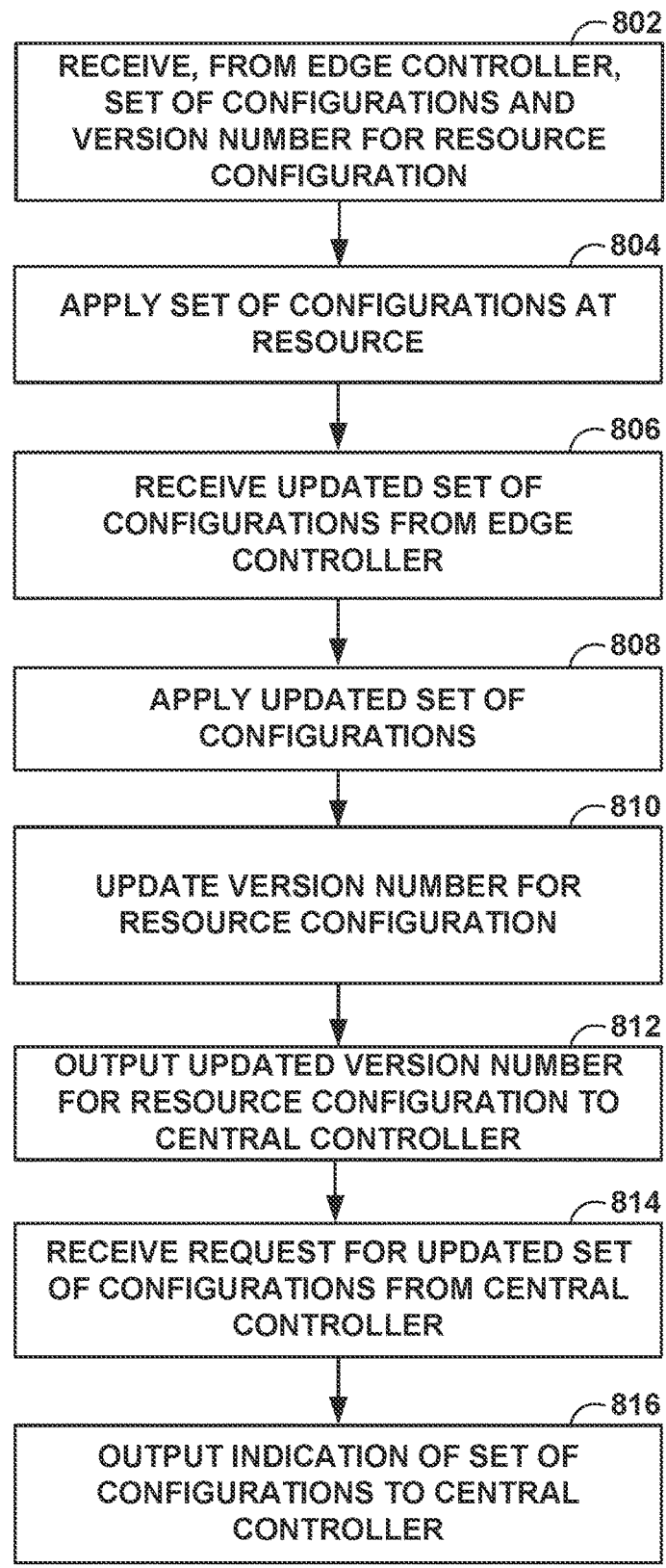
FIG. 11 is a flow chart illustrating an example process for a resource, in accordance with the techniques of the disclosure.

FIG. 11 is a flow chart illustrating an example process for a resource, in accordance with the techniques of the disclosure. FIG. 11 is discussed with reference to FIGS. 1-10 for example purposes only.

A resource (e.g., resource 222) may receive, from an edge controller (e.g., edge controller 220) a set of configurations and a version number for a resource configuration (802). The resource may apply the set of configurations at the resource (804). The resource may receive an updated set of configurations from the edge controller (806). For example, the resource may receive an updated set of configurations from the edge controller that is in response to the resource not satisfying a network performance parameter. In accordance with the techniques of the disclosure, the resource may receive an updated set of configurations from the edge controller during headless mode.

The resource may apply the updated set of configurations (808) and update the version number for the resource configuration (810). For example, the resource may increment the version number for the resource configuration. The resource may output an updated version number for the resource configuration to the central controller (812). The resource may receive a request for the updated set of configurations from the central controller (814) and output an indication of the set of configurations to the central controller (816).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A system comprising:
   processing circuitry; and
   non-transitory computer-readable storage media comprising one or more instructions that, when executed, cause the processing circuitry to:
      receive, from a central controller, a configuration for provisioning a network service at a first resource of an edge device and a network performance requirement for the network service, wherein the central controller is configured to generate the configuration using a stateful intent and a unified graph model;
      after the configuration is applied to the first resource, monitor a performance of the first resource in providing the network service to a client device; and
      based on a determination that the monitored performance of the first resource does not satisfy the network performance requirement for the network service, move the configuration from the first resource to a second resource of the edge device such that the second resource provides the network service to the client device, wherein the configuration, when moved, causes the second resource to send an update to the central controller to enable the central controller to update the unified graph model.

2. The system of claim 1, wherein the instructions cause the processing circuitry to initiate the move of the configuration without communication with the central controller.

3. The system of claim 1, wherein the instructions cause the processing circuitry to initiate the move of the configuration when the system loses connectivity with the central controller.

4. The system of claim 1,
   wherein the second resource is configured to update a version number associated with the configuration in response to the configuration being moved from the first resource to the second resource;
   wherein the second resource is configured to output, to the central controller, an indication of the version number; and
   wherein the central controller is configured to synchronize one or more service-to-resource mappings stored by the central controller with the second resource in response to a determination that the version number output by the second resource does not match a corresponding version number for the second resource that is stored by the central controller.

5. The system of claim 1, wherein the configuration is a first configuration, wherein the network service is a first network service, and wherein the instructions further cause the processing circuitry to:
   receive, from the central controller, a second configuration for provisioning a second network service at the first resource; and
   based on a determination that the monitored performance of the first resource does not satisfy the network performance requirement for the network service and based on a determination that both the first configuration and the second configuration are assigned to a configuration group, move the second configuration from the first resource to the second resource of the edge device.

6. The system of claim 1, wherein the configuration is a first configuration, wherein the network service is a first network service, and wherein the instructions further cause the processing circuitry to:
receive, from the central controller, a second configuration for provisioning a second network service at the first resource; and
wherein to move the first configuration from the first resource to the second resource of the edge device, the instructions cause the processing circuitry to refrain from moving the second configuration based on a determination that first configuration and the second configuration are assigned to different configuration groups.

7. The system of claim 6, wherein the network performance requirement is a first network performance requirement and wherein the instructions further cause the processing circuitry to:
receive a second network performance requirement for the second network service;
after the second configuration is applied to the first resource, monitor a performance of the first resource in providing the second network service to the client device; and
based on a determination that the monitored performance of the first resource does not satisfy the second network performance requirement for the second network service, move the second configuration from the first resource to the second resource of the edge device such that the second resource provides the second network service to the client device.

8. The system of claim 1, wherein the instructions further cause the processing circuitry to:
receive, from the central controller, a resource association constraint indicating one or more constraints for moving the configuration; and
select the second resource based on the resource association constraint.

9. The system of claim 1, wherein the monitored performance comprises one or more of:
an amount of bandwidth between the first resource and the client device;
an amount of latency between the first resource and the client device; or
an amount of jitter between the first resource and the client device.

10. The system of claim 1, wherein the configuration is a first configuration, wherein the client device comprises a first client device assigned to a first branch and wherein the instructions further cause the processing circuitry to:
apply the first configuration to the first resource to cause the first resource to provide the first network service to the first client device; and
apply a second configuration to the first resource to cause the first resource to provide a second network service to a second client device assigned to a second branch, wherein the first branch corresponds to a geographical location different from the second branch.

11. The system of claim 10, wherein the first branch and the second branch are assigned to a common tenant.

12. The system of claim 10, wherein the first branch and the second branch are assigned to different tenants.

13. The system of claim 1, wherein the instructions further cause the processing circuitry to receive, from the central controller, a configuration group identifier identifying a configuration group for the configuration, the configuration group identifier comprising a tenant name.

14. The system of claim 1, wherein the instructions further cause the processing circuitry to receive, from the central controller, a configuration group identifier identifying a configuration group for the configuration, the configuration group identifier comprising a branch name for the client device.

15. The system of claim 1, wherein the edge device is geographically closer to the client device than the central controller.

16. The system of claim 1, wherein the first resource comprises a virtualized device.

17. The system of claim 1, wherein the first resource comprises a network device managed by the system.

18. A method comprising:
receiving, by an edge controller implemented in circuitry and from a central controller, a configuration for provisioning a network service at a first resource of an edge device, and a network performance requirement for the network service, wherein the central controller is configured to generate the configuration using a stateful intent and a unified graph model;
after applying the configuration to the first resource, monitoring, by the edge controller, performance of the first resource in providing the network service to a client device; and
based on the edge controller determining that the monitored performance of the first resource does not satisfy the network performance requirement for the network service, moving, by the edge controller, the configuration from the first resource to a second resource of the edge device such that the second resource provides the network service to the client device, wherein moving the configuration causes the second resource to send an update to the central controller to enable the central controller to update the unified graph model.

19. The method of claim 18, wherein moving the configuration is initiated without the edge controller communicating with the central controller.

20. Non-transitory computer-readable storage media comprising one or more instructions that cause processing circuitry to:
receive, from a central controller, a configuration for provisioning a network service at a first resource of an edge device and a network performance requirement for the network service, wherein the central controller is configured to generate the configuration using a stateful intent and a unified graph model;
after the configuration is applied to the first resource, monitor a performance of the first resource in providing the network service to a client device; and
based on a determination that the monitored performance of the first resource does not satisfy the network performance requirement for the network service, move the configuration from the first resource to a second resource of the edge device such that the second resource provides the network service to the client device, wherein the configuration, when moved, causes the second resource to send an update to the central controller to enable the central controller to update the unified graph model.

* * * * *